United States Patent [19]

Scott

[11] 4,325,833

[45] Apr. 20, 1982

[54] THREE-STAGE CATALYST REGENERATION

[75] Inventor: John W. Scott, Ross, Calif.

[73] Assignee: Chevron Research Company, San Francisco, Calif.

[21] Appl. No.: 163,534

[22] Filed: Jun. 27, 1980

[51] Int. Cl.³ .................. B01J 29/38; B01J 21/20; C10G 11/18; C01B 21/00
[52] U.S. Cl. .................................. 252/417; 110/345; 110/347; 208/148; 208/164; 252/411 S; 252/418; 252/419; 422/142; 422/144; 423/239
[58] Field of Search ........... 252/417, 418, 419, 411 S; 208/164, 148; 422/142, 144; 423/239; 110/345, 347

[56] References Cited

U.S. PATENT DOCUMENTS

| | | | |
|---|---|---|---|
| 2,454,373 | 11/1948 | Blanding | 252/417 |
| 3,902,990 | 9/1975 | Lukenbach | 208/164 |
| 3,909,392 | 9/1975 | Horecky, Jr. et al. | 208/120 |
| 3,926,843 | 12/1975 | Owen | 252/417 |
| 4,064,039 | 12/1977 | Penick | 208/120 |
| 4,115,251 | 9/1978 | Flanders et al. | 208/120 |
| 4,180,454 | 12/1979 | Luckenbach | 208/164 |
| 4,199,435 | 4/1980 | Chessmore et al. | 208/120 |

Primary Examiner—P. E. Konopka
Attorney, Agent, or Firm—D. A. Newell; S. R. LaPaglia; W. D. Reese

[57] ABSTRACT

Coke-containing catalyst is regenerated in a three-stage system to provide complete coke removal while avoiding carbon monoxide and nitrogen oxides contamination of the flue gas formed in burning the coke.

14 Claims, 1 Drawing Figure

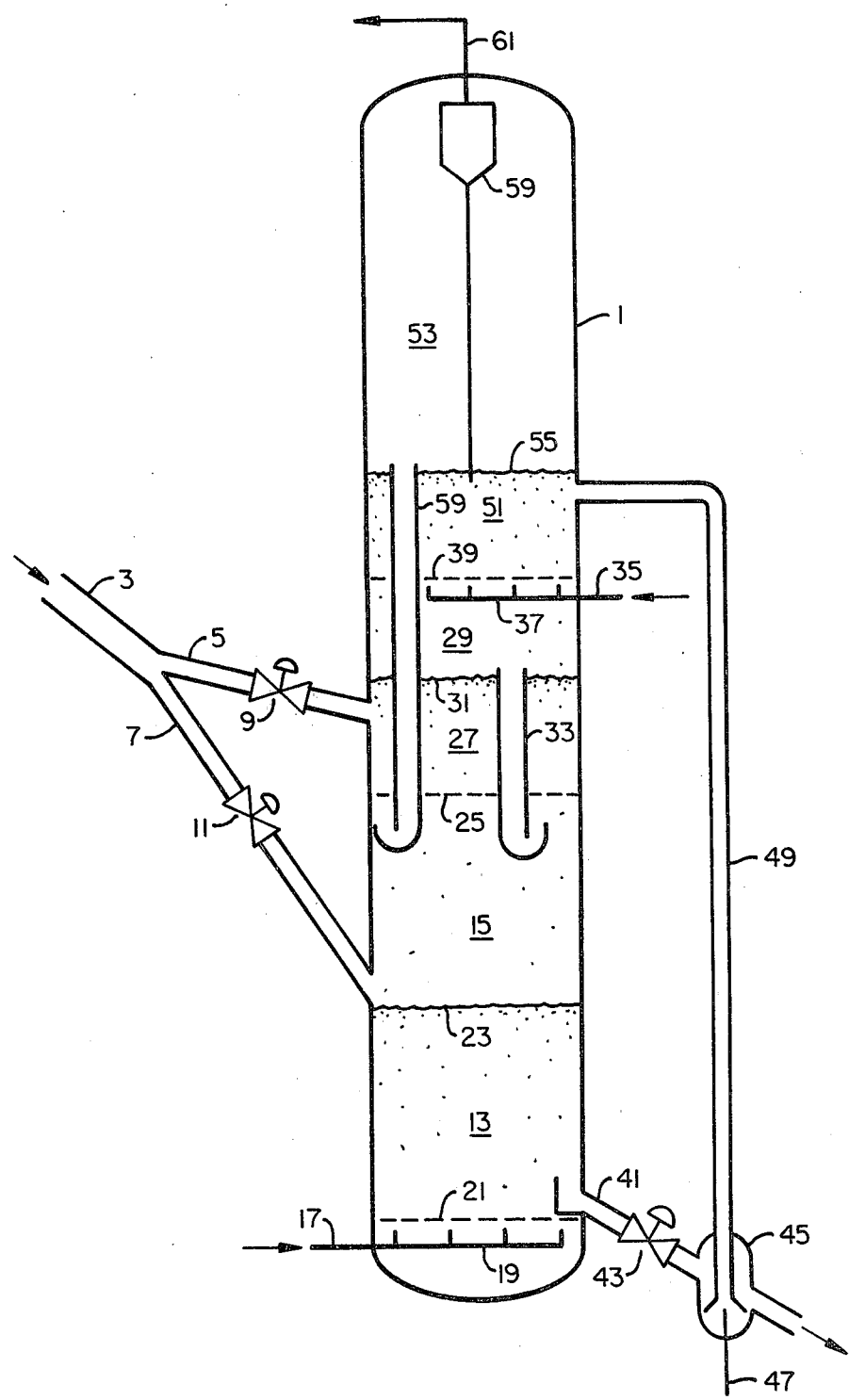

THREE-STAGE CATALYST REGENERATION

BACKGROUND OF THE INVENTION

This invention concerns the art of catalyst regeneration. More specifically, the present invention concerns a method for burning nitrogen-containing coke off coke-containing particulate catalyst while avoiding nitrogen oxides contamination of flue gas formed in burning the coke.

Catalytic cracking systems employ catalyst in a moving bed or a fluidized bed. Catalytic cracking is carried out in the absence of externally supplied molecular hydrogen, in contrast to hydrocracking, in which molecular hydrogen is added during the cracking step. In catalytic cracking, an inventory of particulate catalyst is continuously cycled between a cracking reactor and a catalyst regenerator. In a fluidized catalytic cracking (FCC) system, hydrocarbon feed is contacted with catalyst particles in a hydrocarbon cracking zone, or reactor, at a temperature of about 425° C.–600° C., usually 460° C.–560° C. The reactions of hydrocarbons at the elevated operating temperature result in deposition of coke on the catalyst particles. The resulting fluid products are separated from the coke-deactivated, spent catalyst and are withdrawn from the reactor. The coked catalyst particles are stripped of volatiles, usually by means of steam, and passed to the catalyst regeneration zone. In the catalyst regenerator, the spent catalyst is contacted with a predetermined amount of molecular oxygen. A desired portion of the coke is burned off the catalyst, restoring catalyst activity and simultaneously heating the catalyst to, e.g., 540° C.–815° C., usually 590° C.–730° C. Flue gas formed by combustion of coke in the catalyst regenerator may be treated for removal of particulates and for conversion of carbon monoxide, after which the flue gas is normally discharged into the atmosphere.

Most FCC units now use zeolite-containing catalyst having high activity and selectivity. Zeolite-type catalyst have a particularly high activity and selectivity when the concentration of coke on the catalyst after regeneration is relatively low, so that it is generally desirable to burn off as much coke as possible in regenerating zeolite-containing catalysts. It is also often desirable to burn as much as possible of the carbon monoxide formed by coke burning within the catalyst regeneration system to conserve heat energy. Conservation of heat is especially important when the concentration of coke on the spent cracking catalyst is relatively low as a result of high catalyst selectivity. Among the ways suggested to decrease the amount of carbon on regenerated catalyst and to burn carbon monoxide in a manner which provides process heat, is carrying out carbon monoxide combustion in a dense-phase fluidized catalyst bed in the catalyst regenerator using an active, carbon monoxide combustion promoting metal. Metals have been used either as an integral component of the cracking catalyst particles or as a component of a discrete particulate additive, in which the active metal is associated with a support other than the catalyst particles.

Various ways of employing carbon monoxide combustion promoting metals in cracking systems have been suggested. In U.S. Pat. No. 2,647,860, it is proposed to add 0.1–1 weight percent chromic oxide to a cracking catalyst to promote combustion of carbon monoxide to carbon dioxide and to prevent afterburning. In U.S. Pat. No. 3,808,121, it is proposed to introduce into a catalyst regenerator relatively large sized particles containing a carbon monoxide combustion promoting metal. The circulating particulate solids inventory, comprised of relatively small-sized catalyst particles, is cycled between the cracking reactor and the catalyst regenerator, while the combustion promoting particles remain in the regenerator because of their size. Oxidation promoting metals such as cobalt, copper, nickel, manganese, copper-chromite, etc., impregnated on an inorganic oxide such as alumina, are disclosed. Belgium Patent Publication No. 820,181 suggests using cracking catalyst particles containing platinum, palladium, iridium, rhodium, osmium, ruthenium or rhenium to promote carbon monoxide oxidation in a catalyst regenerator. An amount of the metal between a trace and 100 parts per million is to be added to the catalyst particle, either during catalyst manufacture or during the cracking operation, as by addition of a compound of the combustion promoting metal to the hydrocarbon feed. Inclusion of the promoting metal in the cracking system is said by the publication to decrease product selectivity in the cracking step by substantially increasing coke and hydrogen formation. Catalyst particles containing the promoter metal can be used alone or can be circulated in physical mixture with catalyst particles free of the combustion promoting metal. U.S. Pat. Nos. 4,072,600 and 4,093,535 disclose the use of combustion promoting metals in cracking catalysts in concentrations of 0.01 to 50 ppm, based on total catalyst inventory.

One problem encountered in some cracking operations using metal-promoted complete carbon monoxide combustion-type regeneration has been the generation of undesirable nitrogen oxides ($NO_x$) in the flue gas formed by burning coke. The present invention is directed, in part, toward providing a catalyst regeneration system which accomplishes a high degree of coke removal and complete carbon monoxide combustion within a catalyst regeneration system, while substantially decreasing the concentration of nitrogen oxide present in flue gas formed by burning the coke.

Representative of catalyst regeneration patent literature previously published are the following patents: U.S. Pat. No. 3,909,392 describes a scheme for enhancing carbon monoxide combustion by thermal means. Catalyst is used to provide a dilute-phase heat sink for the increased heat production. British Patent Publication No. 2,001,545 describes a two-stage system for a regenerating catalyst, with partial catalyst regeneration being carried out in the first stage and further, more complete regeneration being carried out in the second stage with a separate regeneration gas. U.S. Pat. No. 3,767,566 describes a two-stage regeneration scheme in which partial regeneration takes place in an entrained catalyst bed, and secondary, more complete regeneration takes place in a dense fluidized catalyst bed. A somewhat similar regeneration operation is described in U.S. Pat. No. 3,902,990, which discusses the use of several stages of regeneration, with dilute and dense-phase beds of catalysts being employed, and with the use of plural streams of regeneration gas. U.S. Pat. No. 3,926,843 describes a plural-stage regeneration scheme in which dilute phase and dense-phase coke burning are performed. British Patent Publication No. 1,499,682 discloses use of a combustion-promoting metal for enhancing carbon monoxide combustion. None of the above cited patents provides a method for forming a flue gas having low concentrations of both carbon monoxide and nitrogen oxides, while accomplishing essentially complete removal of coke from the catalyst.

SUMMARY OF THE INVENTION

I have found that nitrogen-containing coke can be burned off a coke-containing particulate catalyst to provide a low level of residual carbon on the catalyst, and a flue gas low in both carbon monoxide and $NO_x$ can be formed in burning the coke, by the process of (a) burning substantially all coke off a first portion of the coke-containing catalyst with a regeneration gas comprising free oxygen in a first regeneration zone, and burning substantially all carbon monoxide formed in the first zone, sufficient free oxygen being introduced into the first zone to provide at least 1 volume percent residual free oxygen in the regeneration gas after burning the coke and carbon monoxide, whereby nitrogen oxides are formed in the first zone; (b) passing the regeneration gas from the first zone into a second zone, forming carbon monoxide and carbon dioxide and generating a substantially oxygen-free atmosphere in the second zone by burning coke off a second portion of the coke-containing catalyst and burning carbon monoxide with substantially all the residual free oxygen, and decreasing the amount of nitrogen oxides in the regeneration gas by reacting at least a portion of the nitrogen oxides in the oxygen-free atmosphere to form free nitrogen; and (c) passing the regeneration gas from the second zone into a third regeneration zone, burning substantially all carbon monoxide generated in the second regeneration zone with additional free oxygen in contact with substantially coke-free catalyst in the third zone.

In another embodiment, the present invention concerns a method for burning nitrogen-containing coke off a coke-containing particulate catalyst, which comprises; (a) introducing a major portion of the coke-containing catalyst into a first fluidized bed comprising substantially coke-free catalyst in a lower zone in a vertically extending regeneration vessel; (b) passing a regeneration gas comprising free oxygen upwardly through the lower zone, burning substantially all coke off the major portion of coke-containing catalyst in the first bed, and burning substantially all carbon monoxide formed in the first bed within the lower zone, sufficient free oxygen being introduced into the lower zone to provide at least 1 volume percent residual free oxygen in the regeneration gas at the upper end of the lower zone, whereby nitrogen oxides are generated in the lower zone; (c) introducing a minor portion of the coke-containing catalyst into a second fluidized bed of catalyst in a vertically intermediate zone in the regeneration vessel, passing nitrogen oxides-containing regeneration gas from the lower zone upwardly through the intermediate zone, forming carbon monoxide and carbon dioxide and generating a substantially oxygen-free atmosphere in the second bed by reacting substantially all the residual free oxygen with coke and carbon monoxide in the second bed, and decreasing the amount of nitrogen oxides in the regeneration gas by reacting at least a portion of the nitrogen oxides in the intermediate zone to form free nitrogen; and (d) passing carbon monoxide-containing regeneration gas from the intermediate zone upwardly through a third fluidized bed comprising substantially coke-free catalyst in an upper zone in the regeneration vessel, and burning substantially all carbon monoxide introduced into the upper zone with additional free oxygen in contact with the third bed.

DESCRIPTION OF THE DRAWING

The attached drawing is a schematic representation of one preferred embodiment of the present invention.

Referring to the drawing, there is shown a vertically extending regeneration vessel 1. Catalyst having nitrogen-containing coke deposited thereon is introduced into the system through a conduit 3 and is divided into two portions, which pass into two conduits 5 and 7. The relative amounts of spent catalyst passing into these two conduits is controlled by adjustment of valves 9 and 11. A major portion of the coke-containing catalyst flows through the conduit 7 into a dense-phase fluidized bed 13 of substantially coke-free catalyst maintained in a first, lower regeneration zone or section 15 in the vessel 1. A stream of free oxygen-containing regeneration gas is introduced into the vessel through a conduit 17 and a gas distributor 19. The regeneration gas stream passes upwardly through a distribution grid 21 and through the fluidized bed 13, the upper end of which is indicated by a line at 23. Substantially all the coke introduced into the lower zone 15 with the major portion of coke-containing catalyst is burned within the bed 13. Substantially all the carbon monoxide formed in the zone 15 is also burned. Sufficient excess free oxygen is introduced into the zone 15 in the regeneration gas to provide at least 1 volume percent residual free oxygen in the regeneration gas at the upper end of the zone 15 after combustion of coke and carbon monoxide. Nitrogen oxides are formed in the regeneration gas by burning the nitrogen-containing coke in the oxidizing atmosphere present in the zone 15. The regeneration gas stream, containing residual free oxygen and nitrogen oxides, passes out of the lower zone 15 through a gas distribution grid 25. The minor portion of coke-containing catalyst flows through the conduit 5 into a dense-phase fluidized bed 27 of partially regenerated catalyst in a second, vertically intermediate regeneration zone or section 29 in the vessel 1. The top of the dense-phase bed 27 is maintained at a level indicated by a line at 31. Partially regenerated catalyst in the bed 27 passes through an overflow well 33 into the lower section 15 at a rate sufficient to maintain the desired level in the bed 27. The residual free oxygen contained in the regeneration gas entering the intermediate zone is completely consumed in the intermediate zone by burning coke and carbon monoxide in the bed 27, resulting in a substantially oxygen-free atmosphere. Combustion of coke forms carbon dioxide and carbon monoxide. Nitrogen oxides contained in the regeneration gas are reacted to form free nitrogen in the oxygen-free atmosphere in contact with the bed 27, so that the amount of nitrogen oxides in the regeneration gas is substantially decreased. Additional free oxygen-containing gas is introduced into the carbon monoxide-containing regeneration gas stream in the top of the intermediate section 29 above the dense-phase bed 27 by means of a conduit 35 and a distributor 37. The free oxygen-enriched regeneration gas passes out of the intermediate section 29 through a distribution grid 39. Substantially coke-free catalyst is removed from the bed 13 in the lower zone 15 through a conduit 41 at a rate controlled by a valve 43 and passed into a surge vessel 45. Part of the coke-free catalyst in the vessel 45 is entrained upwardly with steam introduced through a conduit 47. The steam and entrained catalyst are passed through a riser conduit 49 into a dense-phase fluidized bed 51 of coke-free catalyst maintained in a third, upper regeneration zone or section 53 in the vessel 1. The top of the dense-phase bed 51 is maintained at a level indicated by a line at 55. Heated catalyst in the bed 51 is passed through an overflow well 57 into the lower section 15. Coke-free catalyst is introduced into and removed from the bed 51 at a rate sufficient to maintain the bed 51 at a desired temperature. The regeneration gas passes from the distribution grid 39 upwardly through the dense-phase bed 51. Carbon monoxide in the regeneration gas is substantially completely burned with the added free oxygen in contact with the coke-free catalyst in the bed 51, so that the catalyst in the bed 51 absorbs essentially all the heat of combustion. The resulting carbon monoxide-free flue gas stream passes upwardly out of the bed 51 and into a cyclone separator 59. Plural cyclones or cyclone stages can, of course, be used. Any catalyst entrained in the flue gas stream is separated in the cyclone and returned to the bed 51, and the regeneration gas (flue gas) is removed from the vessel 1 through a conduit 61. To simplify the foregoing description, various necessary, conventional elements of the embodiment depicted are not shown or described. Such elements, e.g., control means, pumping and compressing means, and the like, and their use and disposition in the embodiment depicted will be apparent to those skilled in the art.

DETAILED DESCRIPTION OF THE INVENTION

As used herein, the term "oxidizing atmosphere" means an atmosphere containing at least 0.5 volume percent molecular oxygen and less than 0.1 volume percent carbon monoxide.

As used herein, the term "substantially oxygen-free atmosphere" means an atmosphere containing less than 0.5 volume percent free (molecular) oxygen.

As used herein, the term "substantially coke-free catalyst" refers to catalyst which contains an average of less than 0.2 weight percent carbon.

As used herein, the term "dense-phase fluidized bed" means a fluidized bed of particulate solids having a density of 8 to 15 pounds per cubic foot, depending on the particle density and the gas velocity.

Catalysts that are best adapted for treatment according to this invention are those in the form of particulate solids. Preferably, the catalyst is sized appropriately for catalytic use in an entrained bed or fluidized bed operation. With reference to catalytic conversion systems present in commercial use, the present invention is especially advantageous for burning coke off spent FCC catalysts; however, use of the present regeneration system is not limited to FCC catalysts and can be used for treating any coke-containing particulate catalyst which can be beneficiated by coke burnoff.

Regeneration according to the invention can be carried out in plural vessels or chambers or in a single, vertically extended vessel or chamber, suitably divided into three zones. The regenerator must, of course, be capable of containing the regeneration gases and catalyst particles at the temperatures and pressures employed in the operation. Suitable vessels will be readily apparent to those skilled in the art from the description herein. When a single, vertically elongated vessel is employed, it can suitably be divided into three regeneration zones or sections in any convenient manner, as by the use, for example, of gas distribution grids, screens, or the like, sized to allow the regeneration gas streams to flow upwardly through the vessel, while preventing substantial flow of catalyst particles between the regeneration zones, except for the controlled catalyst flow described below.

The regeneration gas employed must have an appropriate free oxygen (molecular oxygen) content. Normally, air is quite suitable for use in supplying free oxygen, but use of air is not essential. For example, pure oxygen or oxygen-enriched air can also be used, if desired. Conventional gases used in commercial FCC operations, such as free nitrogen (molecular nitrogen), carbon dioxide, steam, and the like, are suitable for use as fluidizing and entrainment gases.

In general, regeneration conditions employed include a combination of temperature and pressure sufficient to permit the specified degree of coke combustion, carbon monoxide combustion and nitrogen oxides reaction to take place, in the manner discussed below. Temperatures of 540° C. to 815° C. are normally quite suitable. Temperatures of 590° C. to 730° C. are preferred. The rates of flow of regeneration gases, entrainment gases and catalyst particles are preferably maintained at levels which provide a dense-phase fluidized bed of catalyst in each of three regeneration zones, although moving beds or entrained beds of catalyst can also be used, if desired, with appropriate, obvious mechanical differences from a fluid-bed operation. The preferred fluid-bed operation can be carried out in a conventional manner by maintaining upward superficial gas velocities appropriate to the size and density of catalyst particles undergoing regeneration and by maintaining proper catalyst introduction and withdrawal rates. The operating pressure is usually not particularly critical. Pressures of 1–20 atmospheres (absolute) are generally quite suitable. Pressures of 1–5 atmospheres are preferred.

The use of a carbon monoxide combustion-promoting metal to aid in burning carbon monoxide in the regeneration gas is strongly preferred in carrying out the invention. Metals and compounds of metals previously suggested for use as carbon monoxide combustion promoters, such as many of the transition metals, can be used. Preferred metals for use in promoting carbon monoxide combustion in the present system include platinum, palladium, iridium, rhodium, ruthenium, osmium, manganese, copper, and chromium. The metal is used in a concentration sufficient to enhance the rate of carbon monoxide burning to the desired degree. Usually, sufficient carbon monoxide combustion promoter is included to provide for complete combustion of cabon monoxide within a dense-phase fluidized bed. In commercial FCC operations, the use of platinum in various forms as a carbon monoxide combustion-promoting metal is known. A carbon monoxide combustion-promoting metal may be included as a component of all, or a major or minor fraction, of the catalyst particles in the system or may be included as a component of discrete, substantially catalytically inert particles which are mixed with the catalyst inventory and are circulated in a physical mixture with the catalyst particles. A preferred metal for use in discrete promoter particles is platinum.

Sulfur oxides contamination of the flue gas, as a result of burning sulfur-containing coke off the catalyst, may advantageously be avoided by using a solid reactant, or acceptor, as a component of the particulate solids subjected to regeneration. Sulfur oxides in the flue gas react with, or adsorb on, the reactant or acceptor to form sulfur-containing solids in the regenerator. This is particularly the case in the oxygen-rich atmosphere provided in the first and third regeneration zones, as discussed below. In this way, the sulfur oxides content of the flue gas leaving the regenerator may be substantially reduced. A preferred solid reactant is alumina, which, in its active form, reacts with sulfur oxides to form a sulfur-containing solid. The active alumina used for reaction with sulfur oxides has a surface area of at least about 50 square meters per gram. Alpha alumina is not suitable. Alumina may suitably be included as a component of all or part of the catalyst particles, and may be included in discrete, substantially catalytically inactive particles physically admixed with the catalyst particles. If discrete alumina-containing particles are mixed with the catalyst, a sufficient amount of alumina is preferably mixed with the catalyst to provide a substantial incremental removal of sulfur oxides from the regeneration gas. Usually, good results can be achieved if 0.1 to 25 weight percent alumina is mixed with the catalyst. If alumina-containing catalyst is used, the catalyst preferably includes (on a zeolite-free basis) less than 50 weight percent silica and more than 25 weight percent alumina.

It will be apparent to those skilled in the art that the amount of coke in coke-containing catalyst, as well as the concentration of nitrogen and sulfur impurities in the coke, will vary widely depending on such factors as the composition and boiling range of the hydrocarbon feed being converted using the catalyst, the composition of the catalyst, the type of hydrocarbon conversion system in which the catalyst is used prior to coke burnoff (e.g., moving bed, fluid bed, entrained bed), etc. The benefits of regeneration according to the invention can be obtained in burning coke off catalysts which contain an amount of coke varying in a broad range, and also for catalysts containing coke having a nitrogen content which can vary over a broad range.

In accordance with the invention, a first portion of the coke-containing catalyst is introduced into a first regeneration zone. A free oxygen-containing regeneration gas is passed through the catalyst in the first regeneration zone. The first portion of coke-containing catalyst generally includes from about 60 percent to about 95 percent of the coke-containing catalyst particles. Preferably, the first portion includes form 80 percent to 90 percent of the coke-containing catalyst. The amount of free oxygen (molecular oxygen) introduced into the first regeneration zone is at least sufficient to react stoichiometrically with substantially all the coke carbon contained in the major portion of coke-containing catalyst and to react with substantially all the carbon monoxide generated in the first zone, with sufficient residual free oxygen being introduced to provide at least 1 volume percent, and, preferably, at least 3 volume percent, free residual oxygen in the regeneration gas withdrawn from the first zone. The composition of the regeneration gas changes, during its passage through the first regeneration zone, from a highly oxidizing atmosphere with a high oxygen concentration and no carbon monoxide when introduced, to a less oxidizing atmosphere, preferably having a relatively low residual free oxygen concentration, preferably less than 10 volume percent, particularly preferably less than 5 volume percent, when the regeneration gas is withdrawn from the first regeneration zone after combustion of the coke and carbon monoxide.

Because of the oxidizing atmosphere provided in the first regeneration zone and the essentially complete coke and carbon monoxide combustion carried out, combustion of nitrogen-containing compounds in the coke on the catalyst in the first regeneration zone results in generation of nitrogen oxides, especially in the presence of a carbon monoxide combustion-promoting metal, such as platinum. Accordingly, the regeneration gas is contaminated with nitrogen oxides when it is removed from the first regeneration zone. Nitrogen oxides in the regeneration gas are reacted, or reduced, to form free nitrogen (molecular nitrogen) in a second regeneration zone in a substantially oxygen-free atmosphere generated by combustion of essentially all the remaining free oxygen with carbon monoxide and coke on spent and partially regenerated catalyst in the second regeneration zone.

In accordance with the invention, a second portion of the coke-containing catalyst, preferably 10–20 percent of the coke-containing catalyst, is introduced into a second regeneration zone. The nitrogen oxides-containing regeneration gas withdrawn from the first regeneration zone is passed through the catalyst in the second regeneration zone. Coke-containing catalyst is introduced into the second regeneration zone in an amount at least sufficient to react with essentially all of the residual oxygen in the regeneration gas to form carbon monoxide and carbon dioxide and to generate a substantially oxygen-free atmosphere in the regeneration gas in contact with the catalyst bed in the second regeneration zone. The oxygen-free atmosphere preferably contains at least 0.5 volume percent carbon monoxide and particularly preferably at least 2.0 volume percent carbon monoxide. Since essentially all the free oxygen in the regeneration gas is consumed in burning coke and carbon monoxide, the free oxygen concentration of the regeneration gas in the second regeneration zone is decreased to less than 0.5 volume percent and preferably less than 0.1 volume percent. The pressure of a substantially oxygen-free atmosphere in the regeneration gas causes the nitrogen oxides to react, at least partially, to form free nitrogen (molecular nitrogen). The rate of introduction of spent catalyst into the second regeneration zone and the rate of withdrawal of catalyst are preferably adjusted so that catalyst removed from the second zone is partially regenerated, which may be defined as catalyst having a coke carbon content of less than the coke carbon content the original coke-containing catalyst and greater than 0.2 weight percent. Preferably, catalyst in the second regeneration zone is maintained as a dense-phase fluidized bed of coke-containing partially regenerated catalyst. Preferably, catalyst is withdrawn from the second regeneration zone after partial coke removal and introduced into the first regeneration zone in order to provide complete coke removal.

Additional free oxygen is introduced into the oxygen-free, typically carbon monoxide-containing, regeneration gas after nitrogen oxides have been reacted to form free nitrogen in the substantially oxygen-free atmosphere. The additional free oxygen can suitably be added in any free oxygen-containing gas, such as pure oxygen, air, or the like. The amount of additional free oxygen introduced into the regeneration gas is preferably at least sufficient to react stoichiometrically with all the carbon monoxide in the regeneration gas leaving the second regeneration zone to form carbon dioxide. Particularly preferably, enough free additional oxygen is introduced into the regeneration gas to provide a residual free oxygen concentration of at least 3 volume percent in the regeneration gas (flue gas) after combustion of substantially all the carbon monoxide in the regeneration gas in a third regeneration zone. The regeneration gas is introduced into the third regeneration zone, either before or after the additional free oxygen is introduced into it.

Combustion of carbon monoxide contained in the regeneration gas with the added free oxygen releases a substantial amount of heat into the regeneration gas in the third regeneration zone. It is advantageous to recover this heat energy from the regeneration gas prior to its removal from the regeneration system. The heat energy conserved is often useful for carrying out a related catalytic conversion operation (e.g., FCC conversion) with the resulting coke-free catalyst. Typically, regeneration gases have a low heat capacity, so that combustion of carbon monoxide can heat regeneration gas to an extremely high temperature if the combustion takes place where the regeneration gas is not in contact with a substantial amount of catalyst, with a consequent possibility of temperature damage to apparatus contacted by the flue gas, such as cyclones, conduits, etc.

According to the invention, heated energy evolved by carbon monoxide combustion in the third regeneration zone is converted by using substantially coke-free catalyst, preferably supplied from the first regeneration zone, to provide a heat sink. Since substantially coke-free catalyst, such as regenerated catalyst recovered from the first regeneration zone, is used for heat absorption, little or no further heat from coke burning is added to the regeneration gas in the third zone, and little or no further nitrogen oxides are generated. Consequently, flue gas withdrawn from the third regeneration zone is low in both nitrogen oxides and carbon monoxide.

Preferably, the amount of substantially coke-free catalyst maintained in the third regeneration zone is sufficient to provide a dense-phase fluidized bed of substantially coke-free catalyst in contact with the regeneration gas during carbon monoxide combustion large enought to allow absorption of essentially all the heat released by carbon monoxide combustion. Particularly preferably, the heat sink provided by the coke-free catalyst is effective to restrict any temperature rise in the regeneration gas in the third regeneration zone to less than 50° C. above the temperature of the regeneration gas in the second regeneration zone. The rate of coke-free catalyst introduction and removal from the third zone is preferably controlled to restrict any increase in temperature in the flue gas to less than 50° C. The amount of coke-free catalyst maintained in the third regeneration zone is sufficient to permit combustion of at least a major portion of the carbon monoxide in the regeneration gases while the gas is in contact with the bed of coke-free catalyst. Particularly preferably, the rates of coke-free catalyst introduction into and withdrawal from the third regeneration zone, and the amount of coke-free catalyst maintained in the third regeneration zone, are sufficient to permit substantially complete combustion of all carbon monoxide in the regeneration gas while the regeneration gas is in contact with a dense-phase fluidized bed of coke-free catalyst.

PREFERRED EMBODIMENT

The invention can best be further understood by referring again to the specific, preferred embodiment shown in the attached drawing.

In carrying out a preferred embodiment of the invention, spent zeolite-type FCC catalyst, preferably containing a substantial amount of alumina capable of reacting with sulfur trioxide to form a sulfur-containing solid, is regenerated. A carbon monoxide combustion-promoting metal additive is employed in the system, preferably in the form of alumina particles containing 0.1 weight percent platinum. The additive particles are preferably mixed with the catalyst particles in an amount sufficient to provide burning of carbon monoxide within the dense-phase catalyst bed 13. The spent FCC catalyst to be regenerated typically contains about 0.3–2.0 weight percent coke, of which, typically 0.01–1 weight percent is nitrogen and 0.25–5.0 weight percent is sulfur. It will be apparent to those skilled in the art that the amount of coke contained in typical spent FCC catalyst, and the amounts of nitrogen and sulfur compounds in the coke vary substantially, depending on the specific feed, conversion conditions and catalyst employed. The mixture of spent catalyst and combustion-promoting additive is introduced into a dense-phase fluidized bed of regenerated, coke-free catalyst in the lower section 15 of regeneration vessel 1 through the conduit 3 at the rate of about 2700 tons per hour. Spent catalyst enters the bed 13 at the rate of about 2000 tons per hour. Oxygen-containing regeneration gas such as air is introduced into the regeneration vessel through the distributor 19 at a rate sufficient to provide enough free oxygen to burn substantially all the coke on the catalyst and any carbon monoxide generated in the bed 13, and to provide with at least 3 volume percent residual free oxygen after complete coke and carbon monoxide burning. Preferably, enough free oxygen is introduced into the bed 13 to supply between about 3 and 5 volume percent free oxygen in excess of the free oxygen necessary for stoichiometric combustion to carbon dioxide of substantially all the coke carbon in the catalyst in the bed 13. Preferably substantially all coke and carbon monoxide are burned within the dense-phase bed 13. Steam is added as necessary to maintain the regeneration gas flow rate and superficial velocity at a proper level to fluidize the catalyst particles in the bed 13.

Coke-containing spent catalyst is introduced at the rate of 400 tons per hour, into the dense-phase fluidized bed 27 of partially regenerated catalyst. Catalyst in the bed 27 has a coke content less than that of the spent catalyst and greater than 0.2 weight percent. Carbon monoxide and carbon dioxide are formed, and essentially all the residual free oxygen in the regeneration gas is consumed, by combustion of coke and carbon monoxide in the fluidized bed 27. Nitrogen oxides in the regeneration gas are reacted in the resulting oxygen-free atmosphere to form free nitrogen. The carbon monoxide concentration in regeneration gas leaving the top 31 of the bed 27 is preferably between about 1 and 15 volume percent. The temperature of the regeneration gas as it passes above the top 31 of the bed 27 is preferably in the range from about 575° to 750° C., for example, about 670° C. Additional free oxygen, in a gas such as air or air and steam, is introduced into the regeneration gas stream, by means of the distributor 37, preferably in an amount sufficient to provide enough free oxygen for essentially complete combustion of all the carbon monoxide in the regeneration gas and to provide for at least 1 volume percent residual free oxygen in the flue gas. Particularly preferably, enough additional free oxygen is introduced into the regeneration gas to provide a residual free oxygen concentration of at least 3 volume percent in flue gas removed from the regeneration vessel through the conduit 61. The flue gas stream above the top 55 of the coke-free catalyst bed 51 in the upper zone 53 of the vessel is preferably maintained at a temperature between 575° C. and 750° C., such as, for example, about 660° C. The flue gas stream preferably contains less than 500 parts per million, by volume, of carbon monoxide.

A preferred embodiment of the present invention having been described, numerous modifications and variations of the invention within the scope of the invention will be apparent to those skilled in the art.

What is claimed is:

1. A method for burning nitrogen-containing coke off a coke-containing particulate catalyst, which comprises:
   (a) separating said coke-containing particulate catalyst into a first portion and a second portion;
   (b) burning substantially all coke off said first portion of said coke-containing catalyst with a regeneration gas comprising free oxygen in a first regeneration zone, and burning substantially all carbon monoxide formed in said first zone, sufficient free oxygen being introduced into said first zone to provide at least 1 volume percent residual free oxygen in said regeneration gas after burning said coke and carbon monoxide, whereby nitrogen oxides are formed in said first zone;
   (c) passing said regeneration gas from said first zone into a second zone, forming carbon monoxide and carbon dioxide and generating a substantially oxygen-free atmosphere in said second zone by burning coke off said second portion of said coke-containing catalyst and burning carbon monoxide with substantially all said residual free oxygen, and decreasing the amount of nitrogen oxides in said regeneration gas by reacting at least a portion of said nitrogen oxides in said oxygen-free atmosphere to form free nitrogen; and
   (d) passing said regeneration gas from said second zone into a third regeneration zone, burning substantially all carbon monoxide generated in said second regeneration zone with additional free oxygen in contact with substantially coke-free catalyst in said third zone.

2. A method according to claim 1 wherein coke in said deactivated catalyst includes a sulfur component, sulfur oxides are formed by burning said coke, and said sulfur oxides are reacted with a solid reactant included with said particulate catalyst in said first regeneration zone to form sulfur-containing solids.

3. A method according to claim 2 wherein said solid reactant comprises alumina.

4. A method according to claim 1 wherein substantially coke-free catalyst is passed from said first regeneration zone into said third regeneration zone.

5. A method according to claim 1 wherein the amount of additional free oxygen added to said regeneration gas is sufficient to provide at least one volume percent free oxygen in regeneration gas withdrawn from said third regeneration zone after burning said carbon monoxide.

6. A method according to claim 1 wherein a carbon monoxide combustion promoter is present in at least said first zone and said third zone.

7. A method according to claim 6 wherein said carbon monoxide combustion promoter is selected from at least one of platinum, palladium, iridium, osmium, rhodium, ruthenium, copper, chromium and manganese.

8. A method for burning nitrogen-containing coke off a coke-containing particulate catalyst, which comprises:
   (a) introducing a major portion of said coke-containing catalyst into a first fluidized bed comprising substantially coke-free catalyst in a lower zone in a vertically extending regeneration vessel;
   (b) passing a regeneration gas comprising free oxygen upwardly through said lower zone, burning substantially all coke off said major portion of coke-containing catalyst in said first bed, and burning substantially all carbon monoxide formed in said first bed within said lower zone, sufficient free oxygen being introduced into said lower zone to provide at least 1 volume percent residual free oxygen in said regeneration gas at the upper end of said lower zone, whereby nitrogen oxides are generated in said lower zone;
   (c) introducing a minor portion of said coke-containing catalyst into a second fluidized bed of catalyst in a vertically intermediate zone in said regeneration vessel, passing nitrogen oxides-containing regeneration gas from said lower zone upwardly through said intermediate zone, forming carbon monoxide and carbon dioxide and generating a substantially oxygen-free atmosphere in said second bed by reacting substantially all said residual free oxygen with coke and carbon monoxide in said second bed, and decreasing the amount of nitrogen oxides in said regeneration gas by reacting at least a portion of said nitrogen oxides in said intermediate zone to form free nitrogen; and
   (d) passing carbon monoxide-containing regeneration gas from said intermediate zone upwardly through a third fluidized bed comprising substantially coke-free catalyst in an upper zone in said regeneration vessel, and burning substantially all carbon monoxide introduced into said upper zone with additional free oxygen in contact with said third bed.

9. A method according to claim 8 wherein coke in said coke-containing catalyst includes a sulfur component, sulfur oxides are formed by burning said coke in said lower and upper zones, and the amount of sulfur oxides in said regeneration gas is decreased by reacting said sulfur oxides with a solid reactant included with said particulate catalyst to form sulfur-containing solids in said lower and upper zones.

10. A method according to claim 9 wherein said solid reactant comprises alumina.

11. A method according to claim 8 wherein substantially coke-free catalyst is passed from said first regeneration zone into said upper zone.

12. A method according to claim 8 wherein the amount of additional free oxygen introduced into said upper zone is sufficient to provide at least one volume percent free oxygen in regeneration gas withdrawn from said upper zone.

13. A method according to claim 8 wherein a carbon monoxide combustion promoter is in contact with said regeneration gas and said catalyst in at least said lower zone and said upper zone.

14. A method according to claim 13 wherein said carbon monoxide combustion promoter is selected from at least one of platinum, palladium, iridium, osmium, rhodium, ruthenium, copper, chromium and manganese.

* * * * *

UNITED STATES PATENT AND TRADEMARK OFFICE
CERTIFICATE OF CORRECTION

PATENT NO. : 4,325,833
DATED : April 20, 1982
INVENTOR(S) : John W. Scott

It is certified that error appears in the above-identified patent and that said Letters Patent are hereby corrected as shown below:

Col. 6, line 47 "cabon" should read --carbon--

Col. 8, line 35 "pressure" should read --presence--

Col. 9, line 24 "converted" should read --conserved--

Signed and Sealed this

Sixth Day of July 1982

[SEAL]

Attest:

Attesting Officer

GERALD J. MOSSINGHOFF

Commissioner of Patents and Trademarks